No. 791,329. PATENTED MAY 30, 1905.
J. M. DODGE.
SPROCKET WHEEL FOR DRIVE CHAINS.
APPLICATION FILED FEB. 6, 1903.
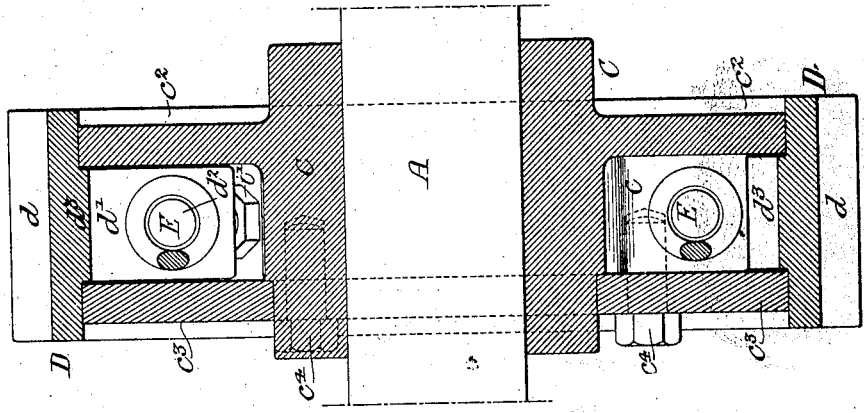
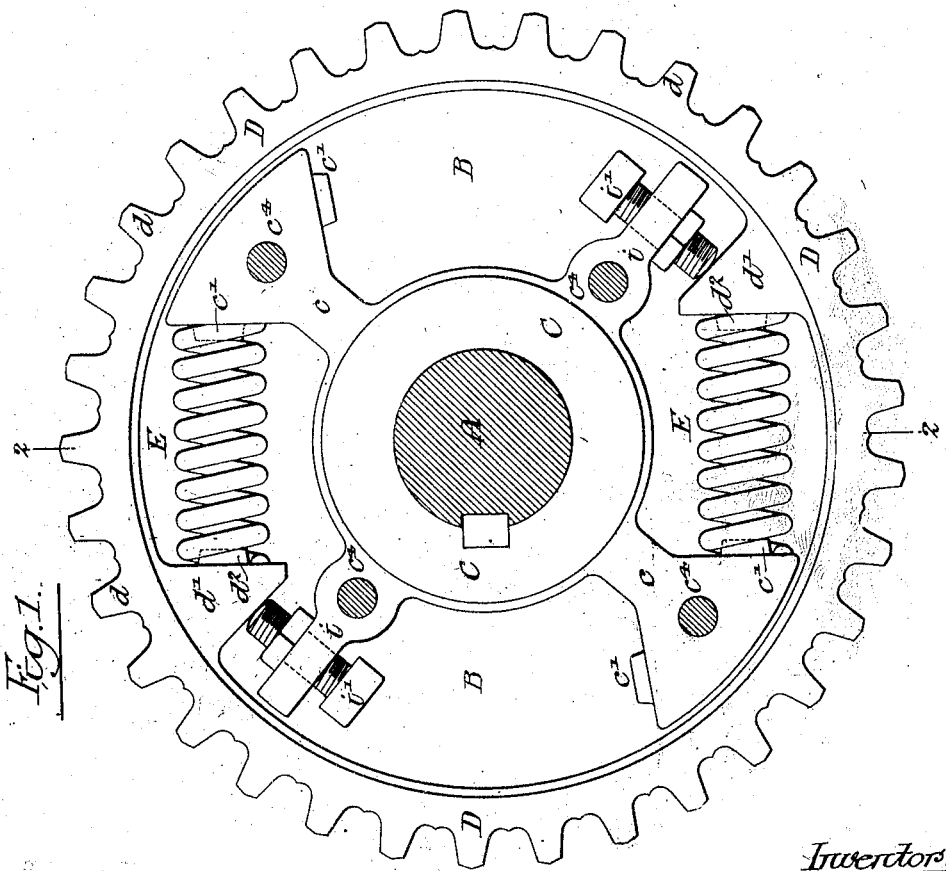
Witnesses:-
Inventor:-
James M. Dodge,
by his Attorneys, No. 791,329.

Patented May 30, 1905.

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

SPROCKET-WHEEL FOR DRIVE-CHAINS.

SPECIFICATION forming part of Letters Patent No. 791,329, dated May 30, 1905.

Application filed February 6, 1903. Serial No. 142,212.

*To all whom it may concern:*

Be it known that I, JAMES M. DODGE, a citizen of the United States, residing in Philadelphia, Pennsylvania, have invented certain Improvements in Sprocket-Wheels for Drive-Chains, of which the following is a specification.

The object of my invention is to provide an equalizing device between a source of power and the driven element, so that if the power-generator is of such a type that there is a pulsation or unevenness in the rotation of the power element the equalizing device will absorb the shock due to this uneven rotation and transmit the power more evenly, and if the device to which power is applied operates unevenly then the equalizing device will absorb this shock and prevent it being carried to the driving mechanism.

My invention is especially applicable to the sprocket-wheels used in connection with what is known as a "silent" drive-chain—that is, a drive-chain having teeth which engage the teeth of a sprocket-wheel, the chain being so constructed as to take up the wear automatically.

Referring to the accompanying drawings, Figure 1 is a side view of my improved sprocket-wheel. Fig. 2 is a sectional view on the line 2 2, Fig. 1.

In the present instance, A is the power-shaft, which may be the crank-shaft of a reciprocating engine or may be geared thereto or to any power-shaft.

B is the sprocket-wheel, made in two parts C and D. The part C is the hub element and the part D is the rim element, having sprocket-teeth $d$. These teeth may be of any shape desired, according to the type of chain used.

The hub element C is keyed to the shaft A and has in the present instance two arms $c\ c$, on which are lugs $c'$. On the rim element D are internal projections $d'$, having lugs $d^2$. Between each projection $d'$ and an arm $c$ is a coiled spring E, which is held in place by the lugs $d^2$ and $c'$. The bearing-faces of the arms and the projections are parallel, so that the longitudinal line through the springs is at right angles to the bearing-faces.

On the hub-section are arms $i\ i$, alternating with the arms $c\ c$, and carried by these arms $i\ i$ are set-screws $i'$, which bear against the back of the internal projections $d'$ of the rim-section, the bearing-surface for the set-screws being at right angles to the longitudinal line of the screws.

The set-screws are used for adjusting the initial tension of the springs E E, and by turning the set-screws the springs can be set to any initial tension desired. These set-screws are not absolutely necessary, but are preferably used.

The hub-section has one side plate, $c^2$, formed integral with it, while the other side plate, $c^3$, is detachable therefrom and is held in place by screw-bolts $c^4$.

The rim-section D has a central annular rib $d^3$, which rests between the two side plates $c^2\ c^3$, as indicated in cross-section, so that it will be held rigidly in line at all points, and while it is free to have a limited rotary motion it is confined laterally to the hub.

It will be seen that the springs and their bearings are located in a direct line with the gear-teeth, and therefore the power transmitted through the sprocket-wheel is in a direct line.

It will be noticed in referring to Fig. 1 that I preferably make the arms $c$ of the hub-section double-faced and each face having a lug $c'$. By this arrangement the rim-section can be mounted on the hub-section with the internal projection of either side of the arm, and the set-screws can be reversed, so that the parts can be assembled according to the direction of rotation of the power-shaft.

While I have illustrated my invention in connection with a sprocket-wheel, it will be understood that it may be used with a gear-wheel without departing from my invention, and the shaft A may in some instances be the driven element instead of the driver.

It will be seen by the above description that my improved sprocket or gear wheel will take up any unevenness in the drive, and especially when it is used as a sprocket-wheel for drive-chains it will prevent the rapid wearing away of the chain and the teeth of the wheel by absorbing the shock due to the uneven rotation of the power-transmitter.

My invention is especially applicable where the power-shaft is the crank-shaft of a reciprocating engine and where a sprocket-wheel is either mounted directly on the power-shaft or geared directly thereto. The unevenness of rotation of the driving-shaft is very apparent, and where a non-yielding sprocket is used on the power-shaft its teeth rapidly wear away, due to the unevenness in the rotation of the shaft; but by providing a compensating element between the power-shaft and the teeth of the sprocket-wheel I am enabled to materially decrease this defect and increase the life of the sprocket-wheel and the chain.

I claim as my invention—

1. The combination in a sprocket-wheel, of a hub-section having side plates, a rim-section mounted on the side plates and having sprocket-teeth, two arms on the hub-section, an internal projection on the rim-section extending into the space between the two arms, a spring mounted between the projection and one of said arms, and a set-screw carried by the other arm and arranged to bear against the said projection, substantially as described.

2. The combination of a hub-section, a rim-section mounted on the hub-section and having teeth thereon, two bearing-arms on the hub-section, with two internal projections on the rim-section, springs, one spring mounted between one projection and one arm, and the other mounted between the other projection and the other arm, with two set-screw-carrying arms on the hub-section, a set-screw in each arm, each set-screw arranged to contact with a projection on the rim-section, substantially as described.

3. The combination of a hub-section arranged to be secured to a shaft, a rim-section having teeth on its periphery, said hub-section having two arms diametrically opposite each other, two internal projections on the rim-section opposite each other, springs mounted between the projections and the arms, arms on the hub alternating with the bearing-arms, set-screws on the said arms arranged to bear against the projections on the rim-section, a side plate integral with the hub, and a side plate detachable therefrom, said side plates supporting the rim-section, with screw-bolts extending through the detachable side plate and into threaded openings in the arms, substantially as described.

In testimony whereof I have signed my name to this specification in the presence of two subscribing witnesses.

JAMES M. DODGE.

Witnesses:
WILL. A. BARR,
JOS. H. KLEIN.